United States Patent

Natsuyama et al.

(10) Patent No.: US 7,718,272 B2
(45) Date of Patent: May 18, 2010

(54) LAMINATED PRODUCT AND PROCESS FOR PRODUCING THE SAME

(75) Inventors: Nobuhiro Natsuyama, Ichihara (JP); Hironobu Shigematsu, Hyogo (JP)

(73) Assignee: Sumitomo Chemical Company Limited, Tokyo (JP)

( * ) Notice: Subject to any disclaimer, the term of this patent is extended or adjusted under 35 U.S.C. 154(b) by 20 days.

(21) Appl. No.: 11/178,364

(22) Filed: Jul. 12, 2005

(65) Prior Publication Data

US 2006/0073351 A1    Apr. 6, 2006

(30) Foreign Application Priority Data

Oct. 5, 2004    (JP)    ............................. 2004-292338

(51) Int. Cl.
*B32B 25/04*    (2006.01)
*B32B 27/00*    (2006.01)

(52) U.S. Cl. ...................... 428/500; 428/492

(58) Field of Classification Search ........................ None
See application file for complete search history.

(56) References Cited

U.S. PATENT DOCUMENTS 6,110,546 A * 8/2000 Honda et al. .................. 428/31

FOREIGN PATENT DOCUMENTS

| CN | 87108200 A | 12/1987 |
|---|---|---|
| EP | 0275702 | 12/1987 |
| EP | 0 955 197 A1 | 11/1999 |
| JP | 2000-94582 | 4/2000 |
| JP | 3254799 | 11/2001 |
| JP | 2003-277620 | 10/2003 |

* cited by examiner

*Primary Examiner*—Sheeba Ahmed
(74) *Attorney, Agent, or Firm*—Foley & Lardner LLP

(57) ABSTRACT

A laminated product comprising (i) a layer containing a sulfur-vulcanized rubber composition, and (ii) a layer containing a thermoplastic elastomer composition produced by dynamically heating (A) an ethylene-α-olefin copolymer rubber, (B) a propylene resin, (C) a mineral oil, (D) a cross-linking agent, and (E) an ethylene resin; and a process for producing a laminated product comprising the steps of (1) dynamically heating the above components (A) to (E), and (2) laminating the above layers (i) and (ii).

10 Claims, No Drawings

LAMINATED PRODUCT AND PROCESS FOR PRODUCING THE SAME

FIELD OF THE INVENTION

The present invention relates to (1) a laminated product comprising (i) a layer, which contains a sulfur-vulcanized rubber composition, and (ii) a layer, which contains a thermoplastic elastomer composition, and is in contact with the layer (i); and (2) a process for producing a laminated product.

BACKGROUND OF THE INVENTION

As a laminated product comprising a rubber layer and a resin layer, there is known a laminated product comprising a rubber layer, which contains a specific vulcanized ethylene-propylene-non-conjugated diene copolymer rubber, and a resin layer, which contains a specific polypropylene resin composition (JP 2000-94582 A).

However, there is a problem in that a long-time use of the above-mentioned laminated product brings yellowing and whitening (namely, a chalking phenomenon) of the rubber layer, so that the laminated product is deteriorated in its appearance.

SUMMARY OF THE INVENTION

In view of the above-mentioned problem in the conventional art, an object of the present invention is to provide (1) a laminated product, which does not bring yellowing and whitening of a thermoplastic elastomer composition-containing layer after a long-time use thereof, so that the laminated product is not deteriorated in its appearance, and (2) a process for producing such a laminated product.

The present invention is a laminated product comprising (i) a layer, which contains a sulfur-vulcanized rubber composition, and (ii) a layer, which is in contact with the layer (i), and contains a thermoplastic elastomer composition produced by dynamically heating at least the following components (A) to (E):

(A) 100 parts by weight of an ethylene-α-olefin copolymer rubber;
(B) 10 to 130 parts by weight of a propylene resin;
(C) 5 to 150 parts by weight of a mineral oil;
(D) 0.01 to 10 parts by weight of a cross-linking agent; and
(E) 5 to 50 parts by weight of an ethylene resin.

Also, present invention is a process for producing a laminated product, which comprises the steps of:

(1) dynamically heating at least the following components (A) to (E),
(A) 100 parts by weight of an ethylene-α-olefin copolymer rubber,
(B) 10 to 130 parts by weight of a propylene resin,
(C) 5 to 150 parts by weight of a mineral oil,
(D) 0.01 to 10 parts by weight of a cross-linking agent, and
(E) 5 to 50 parts by weight of an ethylene resin, thereby producing a thermoplastic elastomer composition; and (2) laminating at least (i) a layer, which contains a sulfur-vulcanized rubber composition, and (ii) a layer, which contains said thermoplastic elastomer composition, and is in contact with the layer (i). This process is hereinafter referred to as "process-1".

Further, the present invention is a laminated product comprising (i) a layer, which contains a sulfur-vulcanized rubber composition, and (ii) a layer, which is in contact with the layer (i), and contains a thermoplastic elastomer composition produced by:

(1) dynamically heating at least the following components (A) to (D),
(A) 100 parts by weight of an ethylene-α-olefin copolymer rubber,
(B) 10 to 130 parts by weight of a propylene resin,
(C) 5 to 150 parts by weight of a mineral oil,
(D) 0.01 to 10 parts by weight of a cross-linking agent, thereby producing an intermediate product; and then,
(2) melt-kneading said intermediate product with (E) 5 to 50 parts by weight of an ethylene resin.

Still further, the present invention is a process for producing a laminated product, which comprises the steps of:

(1) dynamically heating at least the following components (A) to (D),
(A) 100 parts by weight of an ethylene-α-olefin copolymer rubber,
(B) 10 to 130 parts by weight of a propylene resin,
(C) 5 to 150 parts by weight of a mineral oil,
(D) 0.01 to 10 parts by weight of a cross-linking agent, thereby producing an intermediate product;
(2) melt-kneading the intermediate product with (E) 5 to 50 parts by weight of an ethylene resin, thereby producing a thermoplastic elastomer composition; and
(3) laminating at least (i) a layer, which contains a sulfur-vulcanized rubber composition, and (ii) a layer, which contains the thermoplastic elastomer composition, and is in contact with the layer (i). This process is hereinafter referred to as "process-2".

The above-mentioned "(A) ethylene-α-olefin copolymer rubber", "(B) propylene resin", "(C) mineral oil", "(D) cross-linking agent" and "(E) ethylene resin" are hereinafter referred to as "component (A)", "component (B)", "component (C)", "component (D)" and "component (E)", respectively.

DETAILED DESCRIPTION OF THE INVENTION

The component (A) in the present invention means a random copolymer, which contains (1) an ethylene unit in amount of 20 to 90% by weight, and preferably 30 to 80% by weight, (2) one or more kinds of α-olefin units having 3 to 10 carbon atoms in amount of 10 to 70% by weight, and preferably 20 to 60% by weight, and (3) one or more kinds of monomer units selected from the group consisting of (2-1) a conjugated diene unit having 4 to 8 carbon atoms, (2-2) a non-conjugated diene unit having 5 to 15 carbon atoms, (2-3) a vinyl ester compound unit, (2-4) an unsaturated carboxylic acid ester unit, and (2-5) an unsaturated carboxylic acid unit in amount of 0 to 30% by weight, and preferably 0 to 20% by weight, and which has hardness A of 98 or smaller measured according to JIS K-6253 (JIS: Japanese Industrial Standards), wherein the total amount of the above units (1), (2) and (3) is 100% by weight. A monomer unit (for example, the above-mentioned "ethylene unit") means a unit of a polymerized monomer (for example, ethylene).

Examples of the above-mentioned α-olefin are propylene, 1-butene, 2-methylpropylene, 1-pentene, 3-methyl-1-butene, 1-hexene, 4-methyl-1-pentene, and 1-octene. Among them, preferred is propylene or 1-butene, and more preferred is propylene, from a viewpoint of availability.

Examples of the above-mentioned conjugated diene having 4 to 8 carbon atoms are 1,3-butadiene, 2-methyl-1,3-butadiene (isoprene), 1,3-pentadiene, and 2,3-dimethyl-1,3-butadiene.

Examples of the above-mentioned non-conjugated diene having 5 to 15 carbon atoms are dicyclopentadiene, 5-ethylidene-2-norbornene, 1,4-hexadiene, 1,5-dicyclooctadiene, 7-methyl-1,6-octadiene, and 5-vinyl-2-norbornene.

An example of the above-mentioned vinyl ester compound is vinyl acetate.

Examples of the above-mentioned unsaturated carboxylic acid ester are methyl acrylate, ethyl acrylate, butyl acrylate, methyl methacrylate, and ethyl methacrylate.

Examples of the above-mentioned unsaturated carboxylic acid are acrylic acid and methacrylic acid.

Among them, preferred is a non-conjugated diene such as dicyclopentadiene and 5-ethylidene-2-norbornene from a viewpoint of availability.

Examples of the component (A) are an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer, an ethylene-propylene-1-octene copolymer, and an ethylene-propylene-5-ethylidene-2-norbornene copolymer, and a combination of two or more thereof. The component (A) can be produced according to a process known in the art.

A ratio of an amount of an ethylene unit contained in the component (A) to that of an α-olefin unit contained therein is usually 90/10 to 30/70 by weight. The component (A) is preferably a copolymer rubber containing an ethylene unit and a propylene unit, wherein a ratio of an amount of the ethylene unit to that of the propylene unit is 85/15 to 45/55 by weight.

The component (A) has a Mooney viscosity ($ML_{1+4}$ 100° C.) of preferably 10 to 350, and more preferably 30 to 300. When the Mooney viscosity is lower than 10, an obtained thermoplastic elastomer composition may be deteriorated in its mechanical strength. When the Mooney viscosity is higher than 350, an obtained laminated product may be deteriorated in its appearance. Here, while the Mooney viscosity is generally used as a criterion showing a molecular weight of a rubber, its measurable upper limit is substantially 200, and therefore, the Mooney viscosity is usually measured at a temperature, at which the Mooney viscosity of 100 or lower is obtained. Accordingly, a range of the above-mentioned Mooney viscosities of higher than 100 is a range of Mooney viscosities obtained by converting Mooney viscosities measured at a temperature of higher than 100° C. (for example, $ML_{1+4}$ 125° C. and $ML_{1+4}$ 140° C.) to those at 100° C. ($ML_{1+4}$ 100° C.) with an empirical formula.

While an intrinsic viscosity is also used as a criterion showing a molecular weight of a polymer, the component (A) has an intrinsic viscosity of preferably 0.5 to 8.0 dl/g, and further preferably 1.0 to 6.0 dl/g measured at 135° C. in tetrahydronaphthalene (TETRALINE). When the intrinsic viscosity is lower than 0.5, an obtained thermoplastic elastomer composition may be deteriorated in its mechanical strength. When the intrinsic viscosity is higher than 8.0, an obtained laminated product may be deteriorated in its appearance.

The component (B) in the present invention means (1) a homopolymer of propylene, or (2) a random or block copolymer of propylene with ethylene and/or an α-olefin having 4 to 10 carbon atoms (for example, 1-butene, 1-hexene, 1-pentene, 1-octene and 4-methyl-1-pentene), the component (B) containing a propylene unit in amount of 50 to 100% by weight, wherein the total amount of a propylene unit, and an ethylene unit and/or an α-olefin unit contained in the component (B) is 100% by weight. Examples of said copolymer are an ethylene-propylene copolymer, a propylene-1-butene copolymer, a propylene-1-hexene copolymer, a propylene-1-octene copolymer, a propylene-ethylene-1-butene copolymer, and an ethylene-propylene-1-hexene copolymer.

The above-mentioned block copolymer means a copolymer produced according to a process comprising plural steps such as the following, wherein ethylene is a comonomer:

(1) polymerizing propylene, thereby producing a propylene homopolymer; and (2) copolymerizing propylene with ethylene in the presence of said propylene homopolymer.

Therefore, the copolymer produced according to the above-mentioned process is substantially a mixture of the propylene homopolymer produced in the step (1) with the propylene-ethylene copolymer produced in the step (2). Said mixture is not a typical block copolymer having a structure such as ---PPPPPEEEEE---, wherein P is a propylene unit, and E is an ethylene unit, and therefore, PPPPP is a propylene block, and EEEEE is an ethylene block. The reason why said mixture is referred to as a block copolymer in the art may be that said mixture is produced stepwise according to a process comprising plural steps such as the above-mentioned steps (1) and (2).

The component (B) can be produced according to a process known in the art. The component (B) is not particularly limited in its stereostructure. Examples of the stereostructure are an isotactic structure and a syndiotactic structure, and a combined structure thereof. Among them, preferred is the component (B) having an isotactic structure as its major structure.

The component (B) has a melt flow rate of preferably 0.1 to 100 g/10 minutes, and more preferably 0.5 to 50 g/10 minutes measured at 230° C. under a load of 21.18 N according to JIS K6758, JIS being Japanese Industrial Standards.

Examples of the component (C) in the present invention are an aromatic mineral oil, a naphthenic mineral oil, and a paraffinic mineral oil, each of which is a high-boiling distillate of petroleum having an average molecular weight of 300 to 1,500, and a pour point of 0° C. or lower. Among them, preferred is a paraffinic mineral oil. Those mineral oils are classified by a viscosity-gravity constant (V.G.C) of ASTM D2501.

The component (C) may be added to the component (A) as an extender oil, wherein a method of said addition may be that known in the art. Examples of the method are (1) a method of mechanically kneading both components with a kneading machine such as a roll and a Banbury mixer, and (2) a method of adding the component (C) to a solution containing the component (A) (for example, the component (A) produced in a solution state), and then, removing a solvent contained therein by a method such as a steam-stripping method.

Examples of the component (D) in the present invention are sulfur, a phenol resin, and an organic peroxide, which are conventionally used for crosslinking a rubber. Among them, preferred is an organic peroxide. Examples of the organic peroxide are 2,5-dimethyl-2,5-di(t-butylperoxy)hexane, 2,5-dimethyl-2,5-di(t-butylperoxy)hexyne, 1,3-bis(t-butylperoxyisopropyl)benzene, 1,1-di(t-butylperoxy)3,3,5-trimethylcyclohexane, 2,5-dimethyl-2,5-di(peroxybenzoyl)hexyne, and dicumyl peroxide.

The component (D) may be combined with a crosslinking coagent. An example of the crosslinking coagent is a polyfunctional compound such as N,N'-m-phenylenebismaleimide, toluylenebismaleimide, p-quinonedioxime, p,p'-dibenzoylquinonedioxime, nitrosobenzene, diphenylguanidine, divinylbenzene, triallyl isocyanurate, ethylene glycol dimethacrylate, diethylene glycol dimethacrylate, polyethylene glycol dimethacrylate, trimethylolpropane trimethacrylate, and allyl methacrylate. The crosslinking coagent is used in an amount of usually 0.01 to 10 parts by weight per 100 parts by weight of the component (A).

The component (E) in the present invention means (1) a homopolymer of ethylene, or (2) a copolymer of ethylene with an α-olefin having 3 to 10 carbon atoms (for example, propylene, 1-butene, 1-pentene, 4-methyl-1-pentene and 1-hexene) and/or a comonomer containing a polar group and a carbon-to-carbon double bond (for example, vinyl acetate, an acrylic acid ester and a methacrylic acid ester), the component (E) containing an ethylene unit in amount of 80 to 100% by weight, wherein the total amount of an ethylene unit, and an α-olefin unit and/or a comonomer unit contained in the component (E) is 100% by weight. The component (E) is preferably a high-density polyethylene (HDPE), a low-density polyethylene (LDPE), an ethylene-propylene copolymer, an ethylene-1-butene copolymer, an ethylene-1-pentene copolymer, an ethylene-4-methyl-1-pentene copolymer, or an ethylene-1-hexene copolymer.

The component (E) has a melt flow rate of preferably 0.01 to 200 g/10 minutes, and more preferably 0.1 to 100 g/10 minutes measured at 190° C. under a load of 21.18N according to JIS K6760.

The above-mentioned "dynamically heating" in the present invention means a treatment of melt kneading under a shear stress. Said treatment can be carried out with a melt-kneading machine known in the art such as an open-type mixing roll, and a closed-type Banbury mixer, extruder, kneader and continuous mixer. Among them, preferred is a closed-type melt-kneading machine. Said treatment is usually carried out at 150 to 250° C. for 1 to 30 minutes.

Each of the components (B), (C), (D) and (E) is used in an amount of 10 to 130 parts by weight, and preferably 30 to 80 parts by weight; 5 to 150 parts by weight, and preferably 30 to 120 parts by weight; 0.01 to 10 parts by weight, and preferably 0.05 to 5 parts by weight; and 5 to 50 parts by weight, and preferably 10 to 40 parts by weight, respectively, per 100 parts by weight of the component (A).

When said amount of the component (B) is smaller than 10 parts by weight, an obtained thermoplastic elastomer composition may be lowered in its flowability, and therefore, its appearance may be poor. When said amount of the component (B) is larger than 130 parts by weight, an obtained thermoplastic elastomer composition may not have elasticity.

When said amount of the component (C) is smaller than 5 parts by weight, an obtained thermoplastic elastomer composition may be lowered in its flowability, and therefore, its processability may be deteriorated. When said amount of the component (C) is larger than 150 parts by weight, an obtained thermoplastic elastomer composition may be deteriorated in its appearance because of bleeding occurred on its surface.

When said amount of the component (D) is smaller than 0.01 part by weight, it may take too much time to obtain the component (A) having a sufficient degree of crosslinking. When said amount of the component (D) is larger than 10 parts by weight, an obtained thermoplastic elastomer composition may give a very offensive smell, and moreover, the thermoplastic elastomer composition may be lowered in its flowability because of an excessive degree of crosslinking of the component (A).

When said amount of the component (E) is smaller than 5 parts by weight, an obtained thermoplastic elastomer composition may be lowered in its weatherability. When said amount of the component (E) is larger than 50 parts by weight, the thermoplastic elastomer composition may be lowered in its flowability, and therefore, its processability may be deteriorated.

Each of the components (A), (B), (C), (D) and (E) may be combined with an inorganic filler such as talc and calcium carbonate; an additive such as a plasticizer, an antistatic agent, an ultra-violet light absorber, a light stabilizer, an antioxidant, and a mold release gent; or a pigment.

The melt-kneading of the step (2) in the process-2 can be carried out with a closed-type kneader known in the art such as a Banbury mixer, or with a melt-kneader known in the art such as an extruder and an open roll, usually at 150 to 250° C. for 1 to 30 minutes.

The "sulfur-vulcanized rubber composition" in the present invention means a rubber composition vulcanized by a sulfur-containing compound. Examples of the sulfur-containing compound are sulfur, and an organic vulcanizing agent capable of giving an active sulfur such as morpholine disulfide and an alkylphenol disulfide. The rubber in said rubber composition means a rubber, which can be vulcanized by said sulfur-containing compound. Examples of said rubber are an ethylene-α-olefin-non-conjugated diene copolymer rubber, a natural rubber, an isoprene rubber, a butadiene rubber, a styrene-butadiene copolymer rubber, an acrylonitrile-butadiene copolymer rubber, and a butyl rubber. Among them, preferred is an ethylene-α-olefin-non-conjugated diene copolymer rubber from a viewpoint of weatherability and heat resistance of the sulfur-vulcanized rubber composition.

The above-mentioned α-olefin means an α-olefin having 3 to 10 carbon atoms, and examples thereof are propylene, 1-butene, 2-methylpropylene, 1-pentene, 3-methyl-1-butene, 1-hexene, 4-methyl-1-pentene, and 1-octene. Among them, preferred is propylene or 1-butene, and more preferred is propylene, from a viewpoint of availability.

The above-mentioned non-conjugated diene means a non-conjugated diene having 5 to 15 carbon atoms, and examples thereof are dicyclopentadiene, 5-ethylidene-2-norbornene, 1,4-hexadiene, 1,5-dicyclooctadiene, 7-methyl-1,6-octadiene, and 5-vinyl-2-norbornene.

Examples of the above-mentioned ethylene-α-olefin-non-conjugated diene copolymer rubber are an ethylene-propylene-dicyclopentadiene copolymer rubber and an ethylene-propylene-5-ethylidene-2-norbornene copolymer rubber.

The above-mentioned "sulfur-vulcanized rubber composition" can be obtained by vulcanizing a sulfur-vulcanizable rubber composition comprising (1) 100 parts by weight of the above-mentioned rubber, and (2) 0.1 to 10 parts by weight of the above-mentioned sulfur-containing compound. Each of those components (1) and (2) may be combined with an additive such as carbon black, a mineral oil, a processing coagent, an inorganic filler, an antioxidant, and a vulcanization accelerater.

Examples of the above-mentioned mineral oil are those exemplified above as the component (C) in the present invention.

Examples of the above-mentioned processing coagent are ricinoleic acid, stearic acid, palmitic acid, lauric acid, barium stearate, zinc stearate, and calcium stearate.

Examples of the above-mentioned inorganic filler are silica, clay, calcium carbonate, and talc.

Examples of the above-mentioned antioxidant are an aromatic secondary amine compound such as phenylbutylamine and N,N-di-2-naphthyl-p-phenylenediamine; a phenol compound such as dibutylhydroxytoluene and pentaerythrityl tetrakis[3-(3,5-di-tert-butyl-4-hydroxyphenyl)propionate]; a thioether compound such as a bis[2-methyl-4-(3-n-alkylthiopropionyloxy)-5-tert-butyl-phenyl]sulfide; a dithiocarbamate compound such as nickel dibutyldithiocarbamate; and a sulfur compound such as 2-mercaptobenzoyl imidazole, a zinc salt of 2-mercaptobenzimidazole, dilauryl thiodipropionate, and distearyl thiodipropionate.

Examples of the above-mentioned vulcanization accelerater are an aldehyde-amine compound such as a condensation product of n-butylaldehyde and aniline, and a condensation product of butylaldehyde and monobutylamine; a guanidine compound such as diphenylguanidine and diorthotolylguanidine; a thiazole compound such as 2-mercaptobenzothiazole, dibenzothiazyl disulfide, and 2-(2,4-dinitrophenyl)mercaptobenzothiazole; a sulfenamide compound such as N-cyclohexyl-2-benzothiazylsufenamide; a thiuram compound such as tetramethylthiuram disulfide, tetraethylthiuram disulfide, and tetramethylthiuram monosulfide; a thiourea compound such as ethylenethiourea and N,N'-diphenylthiourea; a dithiocarbamate compound such as zinc dimethyldithiocarbamate, zinc diethyldithiocarbamate, and zinc dibutyldithiocarbamate; and a xanthate compound such as zinc dibutylxanthate.

The above-mentioned sulfur-vulcanizable rubber composition can be produced by kneading starting materials with a kneading machine such as an internal mixer (for example, a Banbury mixer, a kneader, and INTERMIX), and an open roll, which are generally used in a rubber industry.

The above-mentioned sulfur-vulcanizable rubber composition can be vulcanized according to a method known in the art. Examples of the method are (1) a method of vulcanizing said rubber composition under molding the said rubber composition according to a molding method such as a press molding method, an injection molding method, and a transfer molding method, and (2) a method of vulcanizing said rubber composition, which comprises the steps of (i) molding said rubber composition into an article having a predetermined shape according to a molding method such as an extrusion molding method and a calendar roll molding method, and then (ii-1) heating said article in a hot air, (ii-2) heating said article in steam, (ii-3) heating said article in an apparatus such as a glass-bead fluidized bed, and a salt bath, or (ii-4) radiating an ultrahigh frequency-electromagnetic wave (UHF) or an electron beam to said article.

A laminated product of the present invention can be produced by laminating a layer comprising the above-mentioned thermoplastic elastomer composition with a layer comprising the above-mentioned sulfur-vulcanized rubber composition, namely, can be produced according to the step (2) in the process-1, or the step (3) in the process-2. Examples of a method for laminating said layers are (i) a method of contacting said layers with each other according to a press molding method or an insert molding method (for example, an injection molding method) under holding them mechanically, (ii) a method of sticking said layers together with an adhesive such as a synthetic rubber adhesive (for example, a polychloroprene rubber adhesive and an acrylonitrile-butadiene rubber adhesive) and an epoxy adhesive, and (iii) a method of melt-extruding the layer comprising a thermoplastic elastomer composition onto the layer comprising a sulfur-vulcanized rubber composition, thereby melt-sticking said layers together.

The above-mentioned layer comprising a thermoplastic elastomer composition has a thickness of usually 50 to 500 μm; and the above-mentioned layer comprising a sulfur-vulcanized rubber composition has a thickness of usually 0.1 to 10 mm. Each of the laminated product of the present invention, and a laminated product produced according to the process-1 or the process-2 of the present invention has a thickness of usually 150 to 5,000 μm.

The laminated product of the present invention, and a laminated product produced according to the process-1 or the process-2 of the present invention are preferably used for vehicle parts such as a glass-run and a weather-strip; sports goods such as sports shoes; building materials; and gaskets.

EXAMPLE

The present invention is explained with reference to the following Examples, which do not limit the scope of the present invention.

Example 1

(1) Production of a Sheet of a Sulfur-vulcanized Rubber Composition

Into a Banbury mixer having an inner temperature of 70° C., there were put 100 parts by weight of an ethylene-propylene-5-ethylidene-2-norbornene copolymer rubber having a trademark of ESPRENE 552 manufactured by Sumitomo Chemical Co., Ltd., and a Mooney viscosity ($ML_{1+4}$ 125° C.) of 85 (corresponding to a Mooney viscosity ($ML_{1+4}$ 100° C.) of 115 converted with an empirical formula), and containing an ethylene unit in an amount of 55% by weight, and a 5-ethylidene-2-norbornene unit in an amount of 4.0% by weight, wherein an amount of said copolymer rubber was 100% by weight; 5 parts by weight of zinc oxide having a trademark of ZINC WHITE #1 manufactured by Sakai Chemical Industry CO., LTD.; 2 parts by weight of stearic acid having a trademark of ADEKA FATTY ACID SA-400 manufactured by Asahi Denka Co., Ltd; 155 parts by weight of FEF carbon having a trademark of ASAHI 60 G manufactured by Asahi Carbon Co., Ltd.; 105 parts by weight of a paraffinic process oil having a trademark of DIANA PW 380 manufactured by Idemitsu Kosan Co., Ltd.; and 55 parts by weight of clay having a trademark of CROWN CLAY manufactured by Shiraishi Calcium Kaisha, LTD. The obtained mixture was melt-kneaded for 5 minutes, thereby obtaining a kneaded product, wherein the above-mentioned inner temperature reached 160° C. at the final stage of said melt-kneading.

There were melt-kneaded with a roll at 40° C. for 10 minutes 422 parts by weight of said kneaded product; 5.0 parts by weight of calcium oxide as an anti-foaming agent having a trademark of VESTA PP manufactured by Inoue Sekkai kougyou Co.; 1.0 part by weight of ethylenethiourea as a vulcanization accelerater having a trademark of RHENOGRAN ETU 80 manufactured by Rhein Chemie Corporation; 1.0 part by weight of 2-mercaptobenzothiazole as a vulcanization accelerater having a trademark of RHENOGRAN MBTS 75 manufactured by Rhein Chemie Corporation; 1.5 part by weight of zinc di-n-butyldithiocarbamate as a vulcanization accelerater having a trademark of RHENOGRAN ZDBC 80 manufactured by Rhein Chemie Corporation; 0.5 part by weight of zinc dimethyldithiocarbamate as a vulcanization accelerater having a trademark of ZDMC 80 manufactured by Rhein Chemie Corporation; and 1.5 part by weight of sulfur having a trademark of SULFUR 200M manufactured by Hosoi Chemical Industry CO., LTD., thereby obtaining a non-sulfur-vulcanized rubber composition.

Said non-sulfur-vulcanized rubber composition was heated at 160° C. for 30 minutes under a pressure with a press molding machine, thereby producing a sulfur-vulcanized sheet having a thickness of 2 mm.

(2) Production of a Thermoplastic Elastomer Composition

There were melt-kneaded with a Banbury mixer at 170 to 200° C. for 10 minutes 200 parts by weight of an ethylenepropylene-5-ethylidene-2-norbornene copolymer rubber having a trademark of ESPRENE 670 F manufactured by Sumitomo Chemical Co., Ltd., and a Mooney viscosity ($ML_{1+4}$ 100° C.) of 53, and containing an ethylene unit in an amount of 66% by weight, and a 5-ethylidene-2-norbornene unit in an amount of 4.0% by weight, wherein an amount of said copolymer rubber was 100% by weight, and also containing 100 parts by weight of an extender oil having a trademark of PW-380 manufactured by Idemitsu Kosan Co., Ltd., wherein an amount of said copolymer rubber was 100 parts by weight; 57.1 parts by weight of a homopolymer of propylene having a trademark of NOBLENE D 101 manufactured by Sumitomo Chemical Co., Ltd., and a melt flow rate of 0.7 g/10 minutes measured at 230° C. under a load of 21.18 N; 28.5 parts by weight of a low-density polyethylene (LDPE: a homopolymer of ethylene) having a trademark of SUMIKATHENE G 201 manufactured by Sumitomo Chemical Co., Ltd., a melt flow rate of 2 g/10 minutes measured at 190° C. under a load of 21.18 N, and a density of 916 $kg/m^3$; 0.29 part by weight of pentaerythrityl tetrakis[3-(3,5-di-tert-butyl-4-hydroxyphenyl)propionate] having a trademark of IRGANOX 1010 manufactured by Ciba Specialty Chemicals K.K.; 0.57 part by weight of 2-(2-hydroxy-3-tert-butyl-5-methylphenyl)-5-chlorobenzo-triazole having a trademark of SUMISORB 300 manufactured by Sumitomo Chemical Co., Ltd.; 0.57 part by weight of a condensation product between 1-(2-hydroxyethyl)-2,2,6,6-tetramethyl-4-piperidinol and dimethyl succinate having a trademark of TINUVIN 622 manufactured by Ciba Specialty Chemicals K.K.; and 0.86 part by weight of trimethylolpropane trimethacrylate having a trademark of HICROSS M-P manufactured by Seiko Chemical Co., Ltd., thereby obtaining a kneaded product.

Said kneaded product was extended with a roll to make a sheet, and said sheet was palletized with a sheet-pelletizer, thereby obtaining pellets. There were homogeneously mixed for 10 minutes with a tumble mixer 100 parts by weight of said pellets, and 0.5 part by weight of 2,5-dimethyl-2,5-di(tert-butylperxy)hexane as a crosslinking agent having a trademark of APO-40 S manufactured by Kayaku Akzo Corcoration, thereby obtaining a mixture.

Said mixture was extruded (namely, dynamically heated) at 200±10° C. with a double screw extruder, thereby producing a thermoplastic elastomer composition.

(3) Production of a Laminated Product

A laminated product was produced according to a method comprising the steps of:

(i) extruding the thermoplastic elastomer composition at 200° C. with a single-screw extruder, thereby obtaining a sheet having a thickness of 1 mm;

(ii) overlapping said sheet and the sulfur-vulcanized sheet obtained in the above (1) inside a metal frame having a thickness of 3 mm, and holding said fame between two metal plates;

(iii) putting said frame on a press machine, and then pressing the overlapped sheets at 175° C. for 5 minutes;

(iv) cooling the overlapped sheets to a room temperature under pressing; and (v) further pressing the overlapped sheet at a room temperature for 5 minutes.

(4) Evaluation of a Laminated Product

According to JIS K 7105, the laminated product obtained in the above (3) was evaluated in a color change of the layer comprising the thermoplastic elastomer composition with an ultraviolet fade meter having a black-panel temperature of 83° C. after a lapse of 400 hours, thereby obtaining a color difference (ΔE) of 1.85.

The reason for evaluating the color change of the layer comprising the thermoplastic elastomer composition is that said color change results from transfer of the sulfur-containing compound remaining in the layer comprising the sulfur-vulcanized rubber composition to the layer comprising the thermoplastic elastomer composition.

The above-mentioned ΔE represents not only yellowing but also a change of a hue as a whole, and a ΔE value of three or smaller is considered to represent a little color change.

Example 2

Example 1 was repeated except that the low-density polyethylene (LDPE) used in Example 1 (2) was changed to 28.5 parts by weight of a high-density polyethylene (HDPE) having a trademark of IDEMITSU HD 211J manufactured by Idemitsu Kosan Co., Ltd., a melt flow rate of 4.7 g/10 minutes measured at 190° C. under a load of 21.18 N, and a density of 965 $kg/m^3$, thereby obtaining a laminated product having a ΔE value of 1.48.

Example 3

Example 1 was repeated except that the low-density polyethylene (LDPE) used in Example 1 (2) was changed to 28.5 parts by weight of a linear low-density polyethylene (LLDPE: an ethylene-1-hexene copolymer) having a trademark of SUMIKATHENE E FV 201 manufactured by Sumitomo Chemical Co., Ltd., a melt flow rate of 2.3 g/10 minutes measured at 190° C. under a load of 21.18 N, and a density of 916 $kg/m^3$, thereby obtaining a laminated product having a ΔE value of 1.26.

Comparative Example 1

Example 1 was repeated except that (i) an amount of the homopolymer of propylene used in Example 1 (2) was changed to 85.7 parts by weight, and (ii) the low-density polyethylene (LDPE) used therein was not used, thereby obtaining a whitened laminated product having a ΔE value of 6.43, said whitening (namely, a chalking phenomenon) resulting from a crack made by deterioration of the surface of the laminated product due to an ultraviolet light.

The components (A), (B) and (E) used for producing the respective thermoplastic elestomer compositions in Examples 1 to 3 and Comparative Example 1 are summarized in Table 1 in their kinds and amounts (parts by weight), together with the evaluation results of the obtained respective laminated products.

Comparative Example 2

Example 1 was repeated except that (i) an amount of the homopolymer of propylene used in Example 1 (2) was changed to 46.9 parts by weight, and (ii) the low-density polyethylene (LDPE) used therein was not used, thereby obtaining a whitened laminated product having a ΔE value of 4.10, said whitening (namely, a chalking phenomenon) resulting from a crack made by deterioration of the surface of the laminated product due to an ultraviolet light.

Example 4

Example 1 was repeated except that the thermoplastic elastomer composition produced in Example 1 (2) was changed to a thermoplastic elastomer composition produced according to the following process, thereby obtaining a laminated product having a ΔE value of 2.43.

There were melt-kneaded with a Banbury mixer at 170 to 200° C. for 10 minutes 200 parts by weight of an ethylene-propylene-5-ethylidene-2-norbornene copolymer rubber having a trademark of ESPRENE 670 F manufactured by Sumitomo Chemical Co., Ltd., and a Mooney viscosity ($ML_{1+4}$ 100° C.) of 53, and containing an ethylene unit in an amount of 66% by weight, and a 5-ethylidene-2-norbornene unit in an amount of 4.0% by weight, wherein an amount of said copolymer rubber was 100% by weight, and also containing 100 parts by weight of an extender oil having a trademark of PW-380 manufactured by Idemitsu Kosan Co., Ltd., wherein an amount of said copolymer rubber was 100 parts by weight; 46.9 parts by weight of a homopolymer of propylene having a trademark of NOBLENE D 101 manufactured by Sumitomo Chemical Co., Ltd., and a melt flow rate of 0.7 g/10 minutes measured at 230° C. under a load of 21.18 N; 0.29 part by weight of pentaerythrityl tetrakis[3-(3,5-di-tert-butyl-4-hydroxyphenyl)propionate] having a trademark of IRGANOX 1010 manufactured by Ciba Specialty Chemicals K.K.; 0.57 part by weight of 2-(2-hydroxy-3-tert-butyl-5-methylphenyl)-5-chlorobenzo-triazole having a trademark of SUMISORB 300 manufactured by Sumitomo Chemical Co., Ltd.; 0.57 part by weight of a condensation product between 1-(2-hydroxyethyl)-2,2,6,6-tetramethyl-4-piperidinol and dimethyl succinate having a trademark of TINUVIN 622 manufactured by Ciba Specialty Chemicals K.K.; and 0.86 part by weight of trimethylolpropane trimethacrylate having a trademark of HICROSS M-P manufactured by Seiko Chemical Co., Ltd., thereby obtaining a kneaded product.

Said kneaded product was extended with a roll to make a sheet, and said sheet was palletized with a sheet-pelletizer, thereby obtaining pellets. There were homogeneously mixed for 10 minutes with a tumble mixer 100 parts by weight of said pellets, and 0.5 part by weight of 2,5-dimethyl-2,5-di (tert-butylperxy)hexane as a crosslinking agent having a trademark of APO-40 S manufactured by Kayaku Akzo Corcoration, thereby obtaining a mixture.

Said mixture was extruded (namely, dynamically heated) at 200±10° C. with a double screw extruder, thereby producing an intermediate product.

There were homogeneously mixed for 10 minutes with a tumble mixer 90 parts by weight of the intermediate product and 10 parts by weight (corresponding to 27.4 parts by weight per 200 parts by weight of the above-mentioned ESPRENE 670 F) of a low-density polyethylene (LDPE: a homopolymer of ethylene) having a trademark of SUMIKATHENE G 201 manufactured by Sumitomo Chemical Co., Ltd., a melt flow rate of 2 g/10 minutes measured at 190° C. under a load of 21.18 N, and a density of 916 kg/m³, thereby obtaining a mixture.

Said mixture was extruded at 200±10° C. with a single screw extruder, thereby producing a thermoplastic elastomer composition.

Example 5

Example 4 repeated except that LDPE used for producing the thermoplastic elastomer composition was changed to a homopolymer of ethylene having a trademark of HIZEX 1300J manufactured by Mitsui Chemicals Inc., a melt flow rate of 12 g/10 minutes measured at 190° C. under a load of 21.18 N, and a density of 961 kg/m³, thereby obtaining a laminated product having a ΔE value of 2.45.

Example 6

Example 4 repeated except that LDPE used for producing the thermoplastic elastomer composition was changed to a linear low-density polyethylene (LLDPE: an ethylene-1-hexene copolymer) having a trademark of SUMIKATHENE E FV 201 manufactured by Sumitomo Chemical Co., Ltd., a melt flow rate of 2.3 g/10 minutes measured at 190° C. under a load of 21.18 N, and a density of 916 kg/m³, thereby obtaining a laminated product having a ΔE value of 2.43.

The components (A), (B) and (E) used for producing the respective thermoplastic elestomer compositions in Comparative Example 2 and Examples 4 to 6 are summarized in Table 2 in their kinds and amounts (parts by weight), together with the evaluation results of the obtained respective laminated products.

TABLE 1

|  | Example | | | Comparative |
|---|---|---|---|---|
|  | 1 | 2 | 3 | Example 1 |
| Component (A) | | | | |
| ESPRENE 670F (Note) | 200 | 200 | 200 | 200 |
| Component (B) | | | | |
| NOBLENE D101 | 57.1 | 57.1 | 57.1 | 85.7 |
| Component (E) | | | | |
| SUMIKATHENE G201 | 28.5 | — | — | — |
| IDEMITSU HD 211J | — | 28.5 | — | — |
| SUMIKATHENE E FV201 | — | — | 28.5 | — |
| Evaluation | | | | |
| ΔE | 1.85 | 1.48 | 1.26 | 6.43 (whitening) |

Note:
Since ESPRENE 670F consists of 100 parts by weight of an ethylene-propylene-5-ethylidene-2-norbornene copolymer rubber, and 100 parts by weight of an extender oil, 200 parts by weight thereof shown in Table 1 consists of 100 parts by weight of said copolymer rubber, and 100 parts by weight of said extender oil.

TABLE 2

|  | Example | | | Comparative |
|---|---|---|---|---|
|  | 4 | 5 | 6 | Example 2 |
| Component (A) | | | | |
| ESPRENE 670F | 200 | 200 | 200 | 200 |
| Component (B) | | | | |
| NOBLENE D101 | 46.9 | 46.9 | 46.9 | 46.9 |
| Component (E) | | | | |
| SUMIKATHENE G201 | 27.4 | — | — | — |
| HIZEX 1300J | — | 27.4 | — | — |
| SUMIKATHENE E FV201 | — | — | 27.4 | — |
| Evaluation | | | | |
| ΔE | 2.43 | 2.45 | 2.43 | 4.10 (whitening) |

The invention claimed is:
1. A laminated product comprising (i) a layer, which contains a sulfur-vulcanized rubber composition, and (ii) a layer, which is in contact with the layer (i), and contains a thermoplastic elastomer composition produced by dynamically heating at least the following components (A) to (E):
- (A) 100 parts by weight of an ethylene-α-olefin copolymer rubber,
- (B) 10 to 130 parts by weight of a propylene resin;
- (C) 5 to 150 parts by weight of a mineral oil;
- (D) 0.01 to 10 parts by weight of a cross-linking agent; and
- (E) 5 to 50 parts by weight of an ethylene resin;

wherein the ethylene-α-olefin copolymer rubber of (A) is an ethylene-propylene-non-conjugated diene rubber, wherein the non-conjugated diene is selected from the group consisting of dicyclopentadiene, 5-ethylidene-2-norbornene, 1,4-hexadiene, 1,5-dicyclooctadiene, 7-methyl-1,6-octadiene, and 5-vinyl-2-norbornene.

2. The laminated product according to claim 1, wherein the amount of the mineral oil (C) is 30 to 120 parts by weight.

3. The product according to claim 1 wherein the product has a color difference of less than three as measured by an ultraviolet fade meter having a black-panel temperature of 83° C. after 400 hours according to JIS K 7105.

4. The product according to claim 3 wherein the product has a color difference of less than two.

5. A process for producing a laminated product, which comprises the steps of:
- (1) dynamically heating at least the following components (A) to (E),
  - (A) 100 parts by weight of an ethylene-α-olefin copolymer rubber,
  - (B) 10 to 130 parts by weight of a propylene resin,
  - (C) 5 to 150 parts by weight of a mineral oil,
  - (D) 0.01 to 10 parts by weight of a cross-linking agent, and
  - (E) 5 to 50 parts by weight of an ethylene resin, thereby producing a thermoplastic elastomer composition; and
- (2) laminating at least (i) a layer, which contains a sulfur-vulcanized rubber composition, and (ii) a layer, which contains said thermoplastic elastomer composition, and is in contact with the layer (i);

wherein the ethylene-α-olefin copolymer rubber of (A) is an ethylene-propylene-non-conjugated diene rubber, wherein the non-conjugated diene is selected from the group consisting of dicyclopentadiene, 5-ethylidene-2-norbornene, 1,4-hexadiene, 1,5-dicyclooctadiene, 7-methyl-1,6-octadiene, and 5-vinyl-2-norbornene.

6. The process according to claim 5, wherein the amount of the mineral oil (C) is 30 to 120 parts by weight.

7. A laminated product comprising (i) a layer, which contains a sulfur-vulcanized rubber composition, and (ii) a layer, which is in contact with the layer (i), and contains a thermoplastic elastomer composition produced by:
- (1) dynamically heating at least the following components (A) to (D),
  - (A) 100 parts by weight of an ethylene-α-olefin copolymer rubber,
  - (B) 10 to 130 parts by weight of a propylene resin,
  - (C) 5 to 150 parts by weight of a mineral oil, and
  - (D) 0.01 to 10 parts by weight of a cross-linking agent, thereby producing an intermediate product; and then,
- (2) melt-kneading said intermediate product with (E) 5 to 50 parts by weight of an ethylene resin;

wherein the ethylene-α-olefin copolymer rubber of (A) is an ethylene-propylene-non-conjugated diene rubber, wherein the non-conjugated diene is selected from the group consisting of dicyclopentadiene, 5-ethylidene-2-norbornene, 1,4-hexadiene, 1,5-dicyclooctadiene, 7-methyl-1,6-octadiene, and 5-vinyl-2-norbornene.

8. The laminated product according to claim 7, wherein the amount of the mineral oil (C) is 30 to 120 parts by weight.

9. A process for producing a laminated product, which comprises the steps of:
- (1) dynamically heating at least the following components (A) to (D),
  - (A) 100 parts by weight of an ethylene-α-olefin copolymer rubber,
  - (B) 10 to 130 parts by weight of a propylene resin,
  - (C) 5 to 150 parts by weight of a mineral oil, and
  - (D) 0.01 to 10 parts by weight of a cross-linking agent, thereby producing an intermediate product;
- (2) melt-kneading the intermediate product with (E) 5 to 50 parts by weight of an ethylene resin, thereby producing a thermoplastic elastomer composition; and
- (3) laminating at least (i) a layer, which contains a sulfur-vulcanized rubber composition, and (ii) a layer, which contains the thermoplastic elastomer composition, and is in contact with the layer (i);

wherein the ethylene-α-olefin copolymer rubber of (A) is an ethylene-propylene-non-conjugated diene rubber, wherein the non-conjugated diene is selected from the group consisting of dicyclopentadiene, 5-ethylidene-2-norbornene, 1,4-hexadiene, 1,5-dicyclooctadiene, 7-methyl-1,6-octadiene, and 5-vinyl-2-norbornene.

10. The process according to claim 9, wherein the amount of the mineral oil (C) is 30 to 120 parts by weight.

* * * * *